(12) United States Patent
Kessler

(10) Patent No.: US 12,286,099 B2
(45) Date of Patent: Apr. 29, 2025

(54) BRAKING AND SIGNALING SCHEMES FOR AUTONOMOUS VEHICLE SYSTEM

(71) Applicant: Glydways, Inc., South San Francisco, CA (US)

(72) Inventor: Patrick Kessler, South San Francisco, CA (US)

(73) Assignee: GLYDWAYS, INC., South San Francisco, CA (US)

( * ) Notice: Subject to any disclaimer, the term of this patent is extended or adjusted under 35 U.S.C. 154(b) by 623 days.

(21) Appl. No.: 17/349,814

(22) Filed: Jun. 16, 2021

(65) Prior Publication Data

US 2021/0394748 A1   Dec. 23, 2021

Related U.S. Application Data

(60) Provisional application No. 63/041,513, filed on Jun. 19, 2020.

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/18109* (2013.01);
(Continued)

(58) Field of Classification Search
CPC ............ B60W 30/09; B60W 30/0953; B60W 30/18109; B60W 2554/4049;
(Continued)

(56) References Cited

U.S. PATENT DOCUMENTS 5,629,669 A * 5/1997 Asano ................ B60K 31/0008
340/436
6,591,180 B1 * 7/2003 Steiner ............... B60K 31/0008
701/96
(Continued)

FOREIGN PATENT DOCUMENTS

JP   2009151562   7/2009
JP   2018-509706  4/2018
(Continued)

OTHER PUBLICATIONS

International Search Report and Written Opinion. Dated Sep. 22, 2021, PCT/US21/37702, filed Jun. 16, 2021, 10 pages.
(Continued)

*Primary Examiner* — Anshul Sood
(74) *Attorney, Agent, or Firm* — Brownstein Hyatt Farber Schreck, LLP

(57) ABSTRACT

A method of decelerating a plurality of vehicles along a roadway may include, at a first vehicle, receiving, from an adjacent downstream vehicle, a first braking initiation signal and a first deceleration value indicating a deceleration rate of the adjacent downstream vehicle, determining a first distance to the adjacent downstream vehicle, and determining, based at least in part on the first distance, a second deceleration value configured to prevent the first vehicle from colliding with the adjacent downstream vehicle. The method may further include in accordance with a determination that the second deceleration value is greater than or equal to an upper deceleration value, decelerating at the upper deceleration value, and, in accordance with a determination that the second deceleration value is less than the upper deceleration value and greater than a lower deceleration target, decelerating at the second deceleration value.

19 Claims, 8 Drawing Sheets

(51) Int. Cl.

| | |
|---|---|
| *B60W 30/18* | (2012.01) |
| *B60W 60/00* | (2020.01) |
| *G05D 1/00* | (2024.01) |
| *G08G 1/00* | (2006.01) |
| *G08G 1/16* | (2006.01) |

(52) U.S. Cl.
CPC ....... *B60W 60/0015* (2020.02); *G05D 1/0289* (2013.01); *G08G 1/16* (2013.01); *G08G 1/22* (2013.01); *B60W 2554/4049* (2020.02); *B60W 2556/65* (2020.02); *B60W 2710/18* (2013.01)

(58) Field of Classification Search
CPC .......... B60W 2710/18; B60T 8/17558; G05D 1/0289; G08G 1/16; G08G 1/22
See application file for complete search history.

(56) References Cited

U.S. PATENT DOCUMENTS

| | | | |
|---|---|---|---|
| 6,728,621 | B1 | 4/2004 | Walenty et al. |
| 7,124,009 | B2* | 10/2006 | Kustosch ................ B60T 17/22 |
| | | | 701/96 |
| 7,509,197 | B2 | 3/2009 | Landes et al. |
| 7,605,842 | B2 | 10/2009 | Wilsey |
| 9,436,183 | B2 | 9/2016 | Thakur |
| 9,475,422 | B2 | 10/2016 | Hillis |
| 9,632,502 | B1 | 4/2017 | Levinson |
| 9,729,233 | B2 | 8/2017 | Nishino |
| 9,958,864 | B2 | 5/2018 | Kentley |
| 10,204,519 | B2 | 2/2019 | Uysal |
| 10,248,119 | B2 | 4/2019 | Kentley |
| 10,688,989 | B2 | 6/2020 | Kim |
| 10,737,667 | B2 | 8/2020 | D'sa |
| 10,822,006 | B2 | 11/2020 | Berger |
| 10,880,293 | B2 | 12/2020 | Kim |
| 10,887,023 | B1 | 1/2021 | Leefer |
| 10,887,741 | B1 | 1/2021 | Indurkar |
| 11,188,741 | B2 | 11/2021 | Kang |
| 2004/0193374 | A1* | 9/2004 | Hac ......................... G08G 1/166 |
| | | | 701/301 |
| 2005/0129410 | A1 | 6/2005 | Wilsey |
| 2006/0173599 | A1 | 8/2006 | Landes et al. |
| 2011/0106391 | A1 | 5/2011 | Shida |
| 2012/0044066 | A1* | 2/2012 | Mauderer .............. G08G 1/161 |
| | | | 340/479 |
| 2015/0154871 | A1 | 6/2015 | Rothoff |
| 2015/0336502 | A1 | 11/2015 | Hills |
| 2016/0094290 | A1 | 3/2016 | Nishino |
| 2016/0209842 | A1 | 7/2016 | Thakur |
| 2016/0231746 | A1 | 8/2016 | Hazelton |
| 2017/0011633 | A1 | 1/2017 | Boegel |
| 2017/0123419 | A1 | 5/2017 | Levinson |
| 2017/0123421 | A1 | 5/2017 | Kentley |
| 2017/0123422 | A1 | 5/2017 | Kentley |
| 2017/0186327 | A1 | 6/2017 | Uysal |
| 2017/0316333 | A1 | 11/2017 | Levinson |
| 2018/0053403 | A1 | 2/2018 | Wieskamp |
| 2018/0279096 | A1 | 9/2018 | Wu |
| 2019/0068582 | A1 | 2/2019 | Kim |
| 2019/0163996 | A1* | 5/2019 | Pitale .................... G08G 1/0129 |
| 2019/0196501 | A1* | 6/2019 | Lesher ...................... B60T 7/22 |
| 2019/0232962 | A1* | 8/2019 | Broll .................... G05D 1/0293 |
| 2019/0379683 | A1 | 12/2019 | Overby |
| 2020/0008028 | A1 | 1/2020 | Yang |
| 2020/0017133 | A1 | 1/2020 | Berger |
| 2020/0019761 | A1 | 1/2020 | Kang |
| 2020/0084193 | A1 | 3/2020 | Beaurepaire |
| 2020/0096626 | A1 | 3/2020 | Wang |
| 2020/0120458 | A1 | 4/2020 | Aldana |
| 2020/0133308 | A1 | 4/2020 | Ralchelgauz |
| 2021/0171034 | A1* | 6/2021 | Nachnolkar ........... G08G 1/163 |
| 2021/0192960 | A1* | 6/2021 | Sambale ................ H04W 4/40 |
| 2021/0232157 | A1* | 7/2021 | Dieckmann .............. G08G 1/22 |
| 2023/0042826 | A1* | 2/2023 | Matthaei .............. G05D 1/0293 |
| 2023/0128224 | A1 | 4/2023 | Leefer |

FOREIGN PATENT DOCUMENTS

| | | |
|---|---|---|
| JP | 2020046900 | 3/2020 |
| JP | 2020-091692 | 6/2020 |
| WO | WO 2010/100725 | 9/2010 |

OTHER PUBLICATIONS

Mohammad Y. Abualhoul, Visible Light Inter-Vehicle Communication for Platooning of Autonomous Vehicles, Aug. 8, 2016, 2016 IEEE Intelligent Vehicles Symposium (Iv) Gothenburg, Sweden, Jun. 19-22, 2016, pp. 508-512.

Hua-Yen Tseng, Charaterizing link asymmetry in vehicle-to-vehicle Visible Light Communications, Jan. 21, 2016, 2015 IEEE Vehicular Networking Conference (VNC), Dec. 16-18, 2015, pp. 88-94.

Alin-Mihcai C'ailean, Current Challenges for Visible Light Communications Usage in Vehicle Applications: A Survey, May 23, 2017, IEEE Communications Surveys & Tutorials, vol. 19, No. 4, Fourth Quarter 2017, pp. 2681-2696.

Mohammad Y. Abualhoul, Enhancing the Field of View Limitation of Visible Light Communication-based Platoon, Nov. 13, 2014, 2014 IEEE 6th International Symposium on Wireless Vehicular Communications (WiVeC 2014), pp. 1-3.

P. Avanzini, Accurate platoon control of urban vehicles based solely on monocular vision, Dec. 3, 2010, 2010 IEEE/RSJ International Conference on Intelligent Robots and Systems, pp. 6077-6079.

Lijian Xu, "Communication Information Structures and Contents for Enhanced Safety of Highway Vehicle Platoons" Mar. 12, 2014, Nov. 5, 2014, IEEE Transaction on Vehicular Technology, Nov. 2014 63:(9) 4206-4215.

Sadayuki Tsugawa, "A Review of Truck Platooning Projects for Energy Savings" Jul. 18, 2016, IEEE Transactions on Intelligent Vehicles, 1(1):68-74 Mar. 2016.

Seyhan Ucar, Security Vulnerabilities of IEEE 802, 11p and Visible light Communication Based Platoon, Jan. 30, 2017, 2016 IEEE Vehicular Networking Conference (VNC) pp. 1-2.

Siyang Zhao, Vehicle to Vehicle Communications and Platooning for EV with Wireless Sensor Network, Oct. 1, 2015, SICE Annual Conference Jul. 28-30, 2015, Hangzhou China, pp. 1435-1439.

Christian Krupitzer, "Towards infrastructure-Aided Self-Organized Hybrid Platooning", Jan. 20, 2019, 2048 IEEE Global Conference on Internet of Things (GCIoT), pp. 1-6.

Mohammad Y. Abualhoul, "Platooning Control Using Visible Light Communications: A Feasibility Study," Jan. 30, 2014, Proceedings of the 16th International IEEE Annual Conference on Intelligent Transportation Systems (ITSC 2013), the Hague, the Netherlands, Oct. 6-9, 2013, pp. 1-5.

Susumu Ishihara, "Improving Reliability if Platooning Control Messages Using Radio and Visible Light Hybrid Communication," Jan. 21, 2016, 2015 IEEE Vehicular Networking Conference (VNC) pp. 96-100.

Notice of Allowance issued Jan. 21, 2025 in corresponding Japanese Patent Application No. 2022-578579.

* cited by examiner

BRAKING AND SIGNALING SCHEMES FOR AUTONOMOUS VEHICLE SYSTEM

CROSS-REFERENCE TO RELATED APPLICATION

This application is a non-provisional of and claims the benefit under 35 U.S.C. 119(e) of U.S. Provisional Patent Application No. 63/041,513, filed Jun. 19, 2020, the contents of which are incorporated herein by reference as if fully disclosed herein.

FIELD

The described embodiments relate generally to vehicles, and, more particularly, to braking and signaling schemes for autonomous vehicles in an autonomous vehicle system.

BACKGROUND

Vehicles, such as cars, trucks, vans, busses, trams, and the like, are ubiquitous in modern society. Cars, trucks, and vans are frequently used for personal transportation to transport relatively small numbers of passengers, while busses, trams, and other large vehicles are frequently used for public transportation. Vehicles may also be used for package transport or other purposes. Such vehicles may be driven on roads, which may include surface roads, bridges, highways, overpasses, or other types of vehicle rights-of-way. Driverless or autonomous vehicles may relieve individuals of the need to manually operate the vehicles for their transportation needs.

SUMMARY

A method of decelerating a plurality of vehicles along a roadway may include, at a first vehicle, receiving, from an adjacent downstream vehicle, a first braking initiation signal and a first deceleration value indicating a deceleration rate of the adjacent downstream vehicle, determining a first distance to the adjacent downstream vehicle, and determining, based at least in part on the first distance, a second deceleration value configured to prevent the first vehicle from colliding with the adjacent downstream vehicle. The method may further include in accordance with a determination that the second deceleration value is greater than or equal to an upper deceleration value, decelerating at the upper deceleration value, and, in accordance with a determination that the second deceleration value is less than the upper deceleration value and greater than a lower deceleration target, decelerating at the second deceleration value. The second deceleration value may further be based at least partially on a speed of the first vehicle, a speed of the adjacent downstream vehicle, and the first deceleration value. The upper deceleration value may correspond to a maximum deceleration value that the first vehicle can undergo without skidding.

The method may further include, in accordance with the determination that the second deceleration value is greater than or equal to the upper deceleration value, transmitting, to an adjacent upstream vehicle a second braking initiation signal and the upper deceleration value. The method may further include, in accordance with the determination that the second deceleration value is less than the upper deceleration value and greater than a lower deceleration target, transmitting, to the adjacent upstream vehicle the second braking initiation signal and the second deceleration value.

The method may further include, in accordance with a determination that the first deceleration value is less than or equal to the lower deceleration target, maintaining a speed of the vehicle, and after maintaining the speed of the vehicle for a duration, detecting a deceleration of the adjacent downstream vehicle and, in response to detecting the deceleration of the adjacent downstream vehicle, decelerating at the lower deceleration target.

The adjacent downstream vehicle may include an optical output system configured to transmit information, and the first vehicle may include an optical sensing system configured to receive information transmitted by the optical output system. The first braking initiation signal may be transmitted via the optical output system of the adjacent downstream vehicle and received by the optical sensing system of the first vehicle. The first deceleration value may be transmitted, via the optical output system of the adjacent downstream vehicle, as an encoded signal.

A vehicle may include a drive system configured to propel the vehicle, a braking system configured to decelerate the vehicle, a steering system configured to steer the vehicle, and a vehicle controller configured to receive, from an adjacent downstream vehicle a first braking initiation signal and a first deceleration value indicating a deceleration rate of the adjacent downstream vehicle, determine a first distance to the adjacent downstream vehicle, and determine, based at least in part on the first distance, a second deceleration value configured to prevent the vehicle from colliding with the adjacent downstream vehicle. In accordance with a determination that the second deceleration value is greater than or equal to an upper deceleration value, the vehicle controller may cause the braking system to decelerate the vehicle at the upper deceleration value, and, in accordance with a determination that the second deceleration value is less than the upper deceleration value and greater than a lower deceleration target, the vehicle controller may cause the braking system to decelerate the vehicle at the second deceleration value. The vehicle may further include an optical output system configured to transmit the deceleration information to the adjacent upstream vehicle and an optical sensing system configured to receive the first braking initiation signal and the first deceleration value.

The vehicle controller may be further configured to determine the second deceleration value based at least in part on a speed of the vehicle and a speed of the adjacent downstream vehicle. The vehicle controller may be further configured to, in accordance with the determination that the second deceleration value is greater than or equal to the upper deceleration value, transmit deceleration information to an adjacent upstream vehicle, the deceleration information comprising a second braking initiation signal and the upper deceleration value. The vehicle controller may be further configured to, in accordance with the determination that the second deceleration value is less than the upper deceleration value, transmit deceleration information to the adjacent upstream vehicle, the deceleration information comprising the second braking initiation signal and the second deceleration value.

A method of decelerating a plurality of vehicles along a roadway may include, at a first vehicle, receiving, from an adjacent downstream vehicle, a first braking initiation signal and a first deceleration value indicating a deceleration rate of the adjacent downstream vehicle, and determining a second deceleration value configured to prevent the first vehicle from colliding with the adjacent downstream vehicle. The method may include, in accordance with a determination that the second deceleration value is greater than or equal to an upper deceleration value transmitting, to a second vehicle, a second braking initiation signal and the upper deceleration value, and decelerating at the upper deceleration value. The method may further include, at the second vehicle, receiving, from the first vehicle, the second braking initiation signal and the upper deceleration value, and determining a third deceleration value configured to prevent the second vehicle from colliding with the first vehicle. The method may further include, in accordance with a determination that the third deceleration value is less than the upper deceleration value and greater than a lower deceleration target, transmitting, to an adjacent upstream vehicle, a third braking initiation signal and the third deceleration value, and decelerating at the third deceleration value.

The method may further include, at the second vehicle, in accordance with a determination that the third deceleration value is greater than or equal to the upper deceleration value, transmitting, to the adjacent upstream vehicle the third braking initiation signal and the upper deceleration value, and decelerating at the upper deceleration value.

A method of determining a deceleration rate for vehicles in a platoon of vehicles may include, at each respective vehicle in the platoon, determining a respective distance to a respective adjacent upstream vehicle and determining a respective deceleration value based at least in part on the respective distance, and, at a vehicle of the platoon associated with a first deceleration value and travelling at a speed, receiving, from an adjacent upstream vehicle a braking indication and a second deceleration value of an upcoming braking event of the adjacent upstream vehicle. The method may further include, in accordance with a determination that the first deceleration value is greater than or equal to an upper deceleration value, decelerating at the upper deceleration value, in accordance with a determination that the first deceleration value is less than the upper deceleration value and greater than a lower deceleration target, decelerating at the first deceleration value, and in accordance with a determination that the first deceleration value is less than or equal to the lower deceleration target, maintaining the vehicle at the speed.

The method may further include, at each respective vehicle in the platoon, determining a speed of the respective adjacent upstream vehicle, and the respective deceleration value may be determined based at least in part on the speed of the respective adjacent upstream vehicle.

The method may further include, at the vehicle, after maintaining the vehicle at the speed, detecting a deceleration of the adjacent upstream vehicle and decelerating at the lower deceleration target. The upper deceleration value may correspond to a maximum deceleration value that the vehicle can undergo without skidding, and the lower deceleration target may be 2.0 m/s2 or less.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
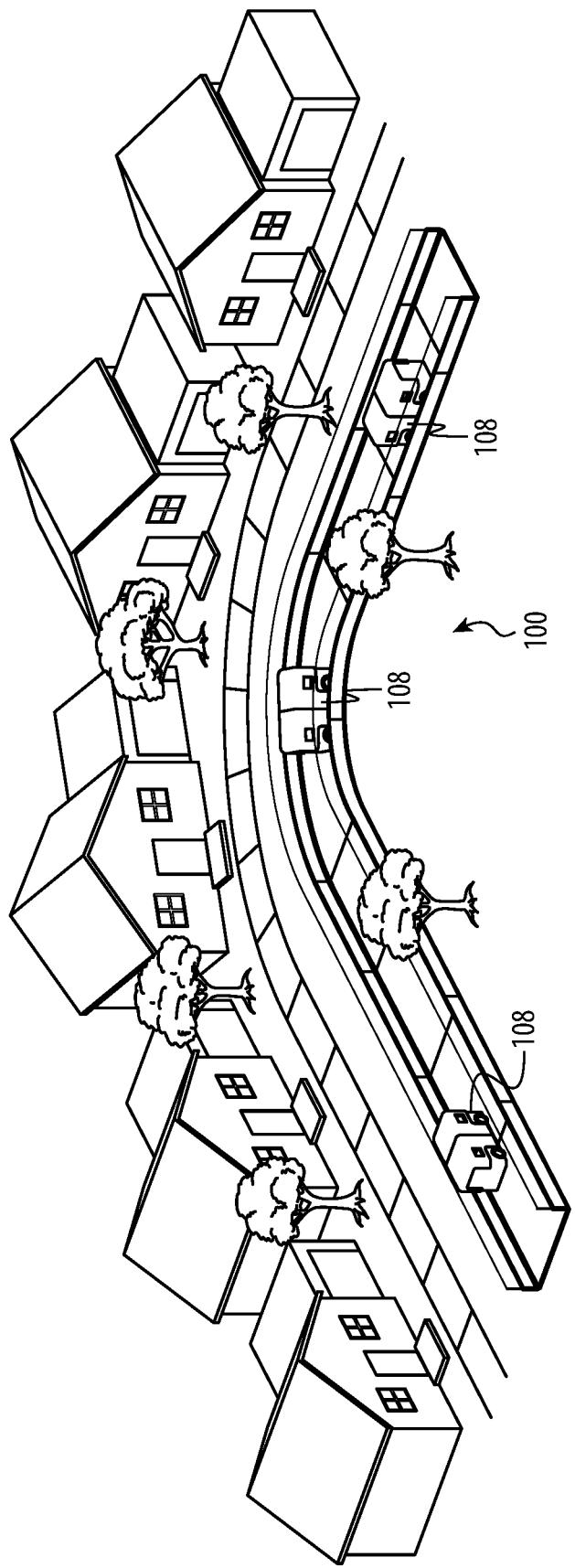
FIG. 1 depicts a portion of an example roadway.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a transportation system in which numerous vehicles may be autonomously operated to transport passengers and/or freight along a roadway. For example, a transportation system or service may provide a fleet of vehicles that operate along a roadway to pick up and drop off passengers at either pre-set locations or stops, or at dynamically selected locations (e.g., selected by a person via a smartphone). As used herein, the term "roadway" may refer to a structure that supports moving vehicles.

Autonomous operation of a vehicle is a complicated task, however, and the particular techniques or schemes employed by the vehicles on the roadway may have a dramatic effect on the operation of the overall system, as well as the comfort and safety of the passengers and/or freight in the vehicles. One important aspect for safe operation of the transportation system is braking. For example, in order to maximize efficiency and throughput of the transportation system, it is advantageous to minimize the distances between vehicles. However, the closer the vehicles are to each other, the more critical it is that trailing vehicles are able to safely stop in the event that a leading vehicle should need to decelerate unexpectedly, such as to avoid an obstacle in the roadway. Accordingly, the safety and efficiency of a transportation system may be increased by providing a robust braking system in which leading vehicles can rapidly disseminate information about their upcoming braking events, and trailing vehicles can react quickly to the information received from the leading vehicles, while also propagating information about the upcoming braking events to further trailing vehicles.

Described herein are various techniques and systems for providing robust and safe braking operations for autonomous vehicles in a transportation system. One aspect of such techniques and systems relates to optical communication systems that allow the vehicles to communicate with one another in a fast, reliable manner. For example, as described herein with respect to FIGS. 2A-2B, vehicles may each include optical output systems and optical input systems that facilitate the transmitting and receiving of braking information, such as braking indications (e.g., an alert indicating an imminent or active braking event), as well as information about the braking event (e.g., the deceleration rate of the vehicle during an imminent or active braking event). Such systems may allow braking event information to pass quickly through a platoon of vehicles so that each vehicle may begin decelerating at an appropriate rate even before deceleration of downstream vehicles would be detected. As used herein, deceleration refers to reduction in speed. It will be understood that a deceleration rate or value may also be characterized as a negative acceleration rate or value. For purposes of calculations or evaluations described herein, either sign convention may be used.

The vehicles may also operate according to a braking control scheme that defines how vehicles in a platoon react to braking events, and also attempts to minimize the number of vehicles that must implement high deceleration values that may be uncomfortable for passengers. For example, as described herein with respect to FIGS. 4-5, the vehicles may each be configured to monitor the speed of and distance to an adjacent upstream vehicle (e.g., the vehicle immediately ahead) and continually determine a deceleration rate that would be required to prevent a collision with the adjacent upstream vehicle. In the event that the adjacent upstream vehicle must decelerate, such as an in emergency situation to avoid a collision with an object or other obstacle in the roadway, the adjacent upstream vehicle may transmit information to the trailing vehicle about the upcoming braking event, such as a planned deceleration rate. The trailing vehicle may then determine how it should react based on the planned deceleration rate of the upstream vehicle as well as its own safety deceleration rate. The trailing vehicle may also provide information to further upstream (e.g., trailing) vehicles so that they can each determine how to react based on the planned deceleration rates of the downstream vehicles and their own respective safety deceleration rates. As described herein, this system allows vehicles to begin decelerating earlier than they may otherwise be able to if they were simply reacting to detected decelerations of the downstream vehicles, and may also reduce the number of vehicles in a platoon (or otherwise in proximity to one another) that must decelerate above a comfortable level.

As used herein, "downstream" refers to objects (e.g., vehicles) that are ahead of a particular vehicle or position in a direction of travel, and "upstream" refers to objects (e.g., vehicles) that are behind a particular vehicle or position in the direction of travel. Thus, for example, in a platoon of vehicles travelling from West to East, the easternmost vehicle in the platoon is considered to be downstream of all other vehicles in the platoon. Similarly, the westernmost vehicle in the platoon is considered to be upstream of all other vehicles in the platoon. Further, unless otherwise noted, the terms "leading" and "trailing" are used to indicate relative positions, not absolute positions. Accordingly, a leading vehicle may be any vehicle that is leading or downstream of another vehicle, and a trailing vehicle may be any vehicle that is following or upstream of another vehicle.

The vehicles in the system may share braking and/or deceleration information using optical communication techniques and/or systems. For example, each vehicle may include an optical sensing system and an optical output system. The optical output systems may be configured to transmit or output information such as braking initiation signals (e.g., an indication that a braking event is imminent or active), planned deceleration values, and the like. The optical output system may include multiple lights that are selectively illuminated to convey information. Optical outputs from one vehicle may be detected by the optical sensing system(s) of other vehicles.

FIG. 1 illustrates a section of roadway 100 for autonomous vehicles 108, in accordance with embodiments described herein. The section of roadway that is shown in FIG. 1 is shown at ground level, in a typical urban or suburban environment, though this is not meant to be limiting. Indeed, the roadway may be deployed in any environment or location, including rural locations, entirely or partially inside buildings, away from roadways, on elevated structures, underground, or the like. The roadway 100 is shown with a plurality of four-wheeled vehicles 108 navigating along the roadway 100. The vehicles 108 may be autonomous or semi-autonomous vehicles specifically designed for use with the roadway 100. One example type of vehicle for use with the roadway 100 is described with respect to FIGS. 7A-9, though other types of vehicles may be driven along the roadway 100 instead of or in addition to those described herein. The roadway 100, of which the segment shown in FIG. 1 may only be a small portion, may include multiple segments including straightaways, turns, intersections, bridges, tunnels, boarding zones, parking facilities, or the like. In order to facilitate safe and efficient vehicle operations, the vehicles 108 on the roadway 100 may employ braking control schemes whereby information about braking events is propagated rapidly between vehicles, and vehicles make intelligent determinations about the rate at which they can and should decelerate to maintain both safety and comfort.

Figure 2A:
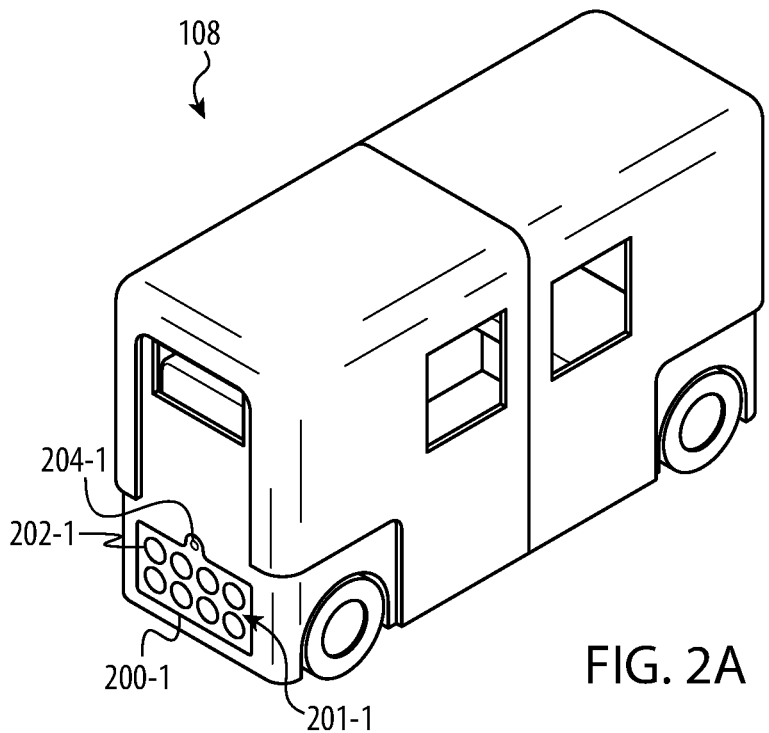
FIGS. 2A-2B depict an example vehicle.
Figure 2B:
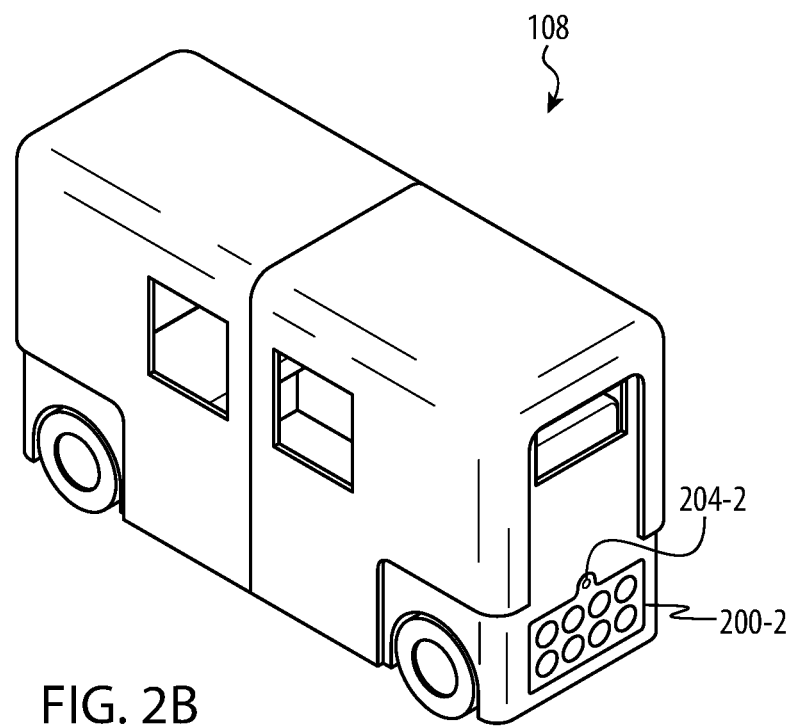

FIGS. 2A and 2B illustrate an example vehicle 108. As described herein, the vehicle 108 may be configured for bidirectional operation. Thus, the vehicle 108 may include an optical communication system 200 (e.g., optical communication systems 200-1, 200-2) on each end of the vehicle. Each optical communication system may include an optical output system 201 (e.g., optical output systems 201-1, 201-2) configured to transmit information to other vehicles, and an optical sensing system 204 (e.g., optical sensing systems 204-1, 204-1) configured to detect and/or receive information from other vehicles (e.g., from the optical output system of another vehicle). This configuration provides several advantages. For example, a vehicle can receive information from a leading vehicle and send information to a trailing vehicle regardless of which end of the vehicle is acting as the "front" of the vehicle. Further, by having both optical output systems and optical sensing systems on both ends of the vehicle, bidirectional communication is possible (e.g., vehicles can communicate with both upstream and downstream vehicles).

The optical output system 201 may include a plurality of light sources 202. The optical output system 201 may transmit information via the light sources 202 by selectively illuminating the light sources according to an encoding scheme. The optical output system 201 may be configured to transmit (and corresponding optical sensing systems may be configured to receive) various types of information to other vehicles, including, for example, deceleration information. Deceleration information may include braking initiation signals and/or deceleration values. As used herein, a deceleration value may refer to a deceleration rate, and unless otherwise noted, these terms may be used interchangeably. Other types of information that may be transmitted and received by the optical communications systems 200 may include, without limitation, the number of vehicles ahead in a platoon, planned or upcoming acceleration and/or deceleration events, information about upcoming maneuvers (e.g., right turn, left turn, planned stop), their number or type of payload in the vehicle (e.g., humans or freight), or the like.

Braking initiation signals may indicate that the signaling vehicle is undergoing a deceleration or braking event, and the deceleration values may indicate the rate at which the vehicle is decelerating, or is going to decelerate. Other information may also be transmitted, such as a time when an upcoming deceleration event is expected or predicted, upcoming steering events (e.g., when and to what extent a leading vehicle will turn), upcoming accelerations, or the like).

A trailing vehicle may receive the information from a leading vehicle's optical output system 201 (e.g., via the trailing vehicle's optical sensing system 204, described herein) and react according to a braking control scheme. For example, upon receipt of deceleration information from a leading vehicle, the trailing vehicle may determine whether it should start to decelerate, what deceleration rate it should use for its deceleration, and what information to send to further trailing vehicles.

The optical outputs from one vehicle may be detected and/or received by an optical sensing system 204 of another vehicle. The optical sensing system 204 may include components such as lenses, image sensors, processors, memory, imaging software and/or firmware, and/or other suitable components that facilitate the capture and/or analysis of images, and optionally the decoding of the information captured. The optical sensing system 204 may have optical properties (e.g., focal length, field of view, resolution) and be oriented so that the optical output system 201 of an adjacent vehicle is optically detectable by the optical sensing system 204.

As noted above, information that is transmitted by the optical communication systems 200 may be in an encoded format. For example, in cases where the optical output systems 201 include multiple light sources, such as shown in FIGS. 2A-2B, each light source may convey a bit of information (e.g., a light source that is off conveys a value of 0, and a light source that is illuminated conveys a value of 1). Thus, for example, an optical output system 201 that includes eight light sources 202 may facilitate an eight-bit channel of information. More or fewer light sources may be used to provide an appropriate amount of information transfer between vehicles.

In some cases, some of the light sources are used for binary or other encoded communications, while others are used to convey dedicated single-bit channels of information. For example, in the optical output systems 201 shown in FIGS. 2A-2B, one light source may be reserved as a braking indicator that conveys a braking initiation signal (e.g., if the light source is on, braking and thus deceleration is currently active; if the light source is off, braking is not active), while the remaining seven light sources are used as a seven-bit channel to convey information such as the deceleration value associated with the braking event (or an upcoming braking event). The seven-bit channel may also be used to convey other information, such as vehicle speed, upcoming maneuvers (e.g., turns, accelerations, decelerations), the type of freight in the vehicles (e.g., packages, passengers), or the like.

The optical communication system 200 may be used to quickly propagate deceleration information between vehicles, and more particularly, to upstream vehicles. As noted above, the information may include more than just the fact that a leading vehicle is actively braking, but also the actual deceleration value at which a leading vehicle is or will be braking. Further, the use of optical communications may allow vehicles that are farther upstream to begin preparing for (or initiating) braking maneuvers even before those vehicles would be able to detect actual deceleration of an immediately adjacent downstream vehicle.

Figure 3A:
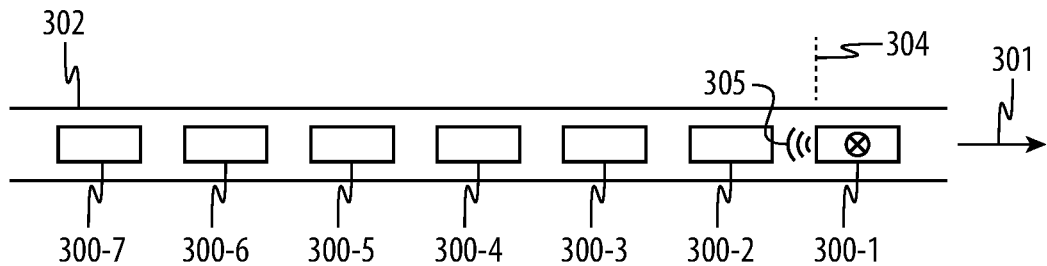
FIGS. 3A-3C depict a top view of a roadway with vehicles employing a braking control scheme.
Figure 3B:
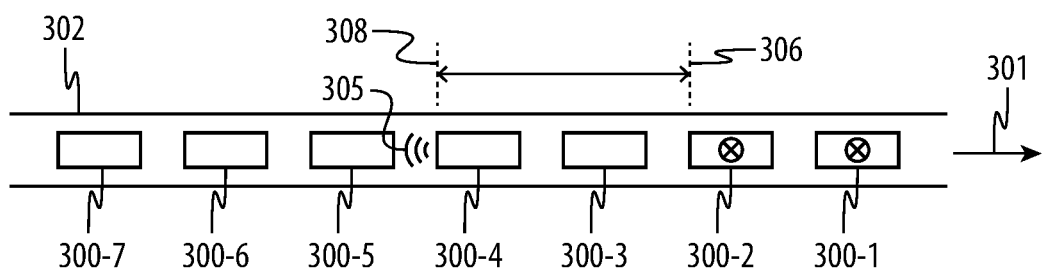
Figure 3C:
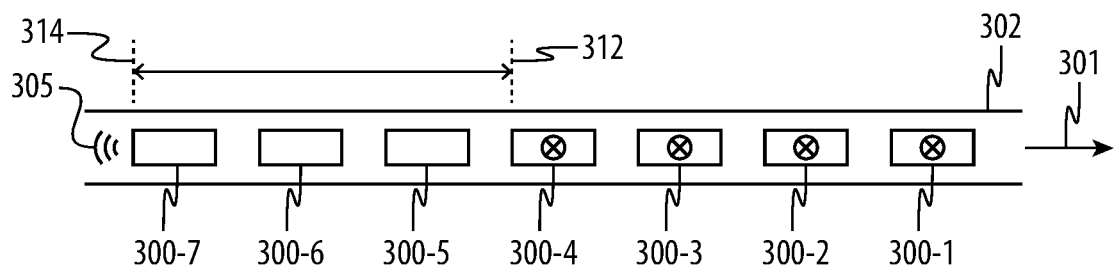

FIGS. 3A-3C depicts a top view of a roadway 302 with multiple vehicles 300 (300-1 through 300-7) traveling along the roadway 302 in a direction of travel 301. FIGS. 3A-3C illustrate how deceleration information, such as deceleration values, may be propagated upstream through a platoon or other group of vehicles. More particularly, FIGS. 3A-3C illustrate how deceleration information may travel through the group of vehicles 300 even faster than the physical braking events.

FIG. 3A illustrates the roadway at a time to. At this time, the vehicle 300-1 may detect an obstacle in the roadway or otherwise need to begin a braking event. Upon the vehicle 300-1 initiating a braking event (or optionally prior to initiating the braking event), the vehicle 300-1 may begin braking (as indicated by the encircled x symbol), and may transmit, to an adjacent upstream vehicle 300-2, a deceleration value 305 indicating the deceleration rate of the vehicle 300-1. The vehicle 300-1 may also transmit a braking initiation signal (e.g., indicating that braking is occurring). At the time to shown in FIG. 3A, the wavefront of the deceleration value 305 and the wavefront of actual braking maneuvers are both at location 304.

Due to the speed of optical communications, the wavefront of the deceleration value information may quickly propagate through the group of vehicles 300. For example, FIG. 3B illustrates the roadway at a time $t_1$. At this time, the vehicles 300-2, 300-3, and 300-4 have received deceleration values from the upstream vehicles, even though only the vehicles 300-1 and 300-2 have actually initiated deceleration. Thus, the wavefront of the deceleration values has travelled further upstream (e.g., to location 308) than the wavefront of the physical braking maneuvers (e.g., to location 306).

FIG. 3C illustrates the roadway 302 at time t2. At this time, the vehicles 300-2, 300-3, and 300-4, 300-5, 300-6, and 300-7 have received deceleration values from the upstream vehicles, even though only the vehicles 300-1, 300-2, 300-3, and 300-4 have actually initiated deceleration. Thus, the wavefront of the deceleration values has travelled further upstream (e.g., to location 314) than the wavefront of the physical braking maneuvers (e.g., to location 312).

FIGS. 3A-3C illustrate how information about imminent braking events can travel through a group of vehicles faster than would be possible if the vehicles were merely reacting to detection of actual physical decelerations of the immediately adjacent upstream vehicle. Because upstream vehicles have information about how the immediately adjacent downstream vehicle is going to decelerate, the upstream vehicles may be able to make determinations about their own braking parameters before they even have to actually begin a deceleration maneuver.

When multiple vehicles are traveling in a platoon or group, and a leading vehicle has to execute a deceleration maneuver (e.g., due to an unexpected obstacle or hazard appearing in the roadway), the leading vehicle may have to decelerate quite rapidly in order to avoid a collision with the obstacle or hazard. In some cases, the leading vehicle may need to decelerate at an upper deceleration value, which may correspond to a maximum deceleration value that the vehicle can undergo without skidding (e.g. without the wheels locking up and causing a sustained slide or skid between the vehicle's tires and the roadway). However, such rapid decelerations may be uncomfortable for passengers and may increase mechanical wear and stresses on the vehicles. Accordingly, it would be advantageous to reduce the number of vehicles in the group of vehicles that need to decelerate at that rate. For example, instead of each vehicle decelerating at the same maximum rate, each vehicle may make an independent determination about its own deceleration rate according to a scheme that results in upstream vehicles decelerating at a slower rate (e.g., a lower deceleration value) than downstream vehicles, when it is safe to do so. The optical communications systems of the vehicles helps facilitate such schemes, as each vehicle can evaluate its own deceleration requirements in view of the actual deceleration rates of the vehicle ahead of it.

Figure 4:
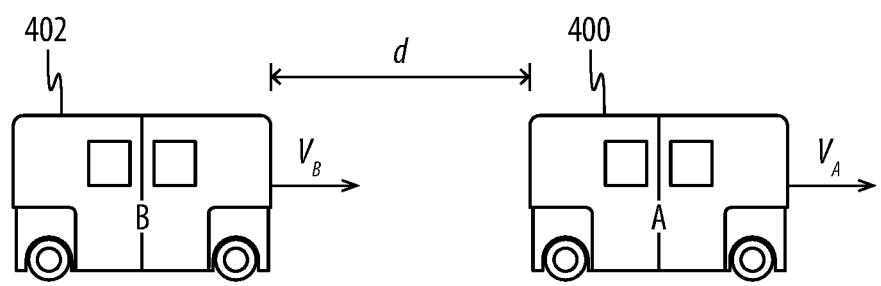
FIG. 4 depicts two example vehicles.
Figure 5:
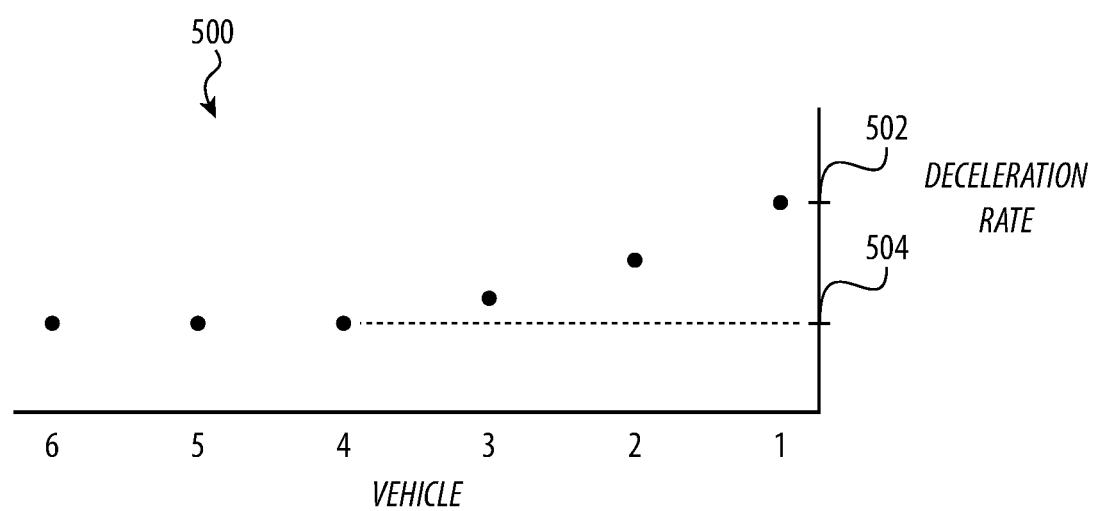
FIG. 5 depicts a plot of deceleration rates of several vehicles travelling in a group.
Figure 6:
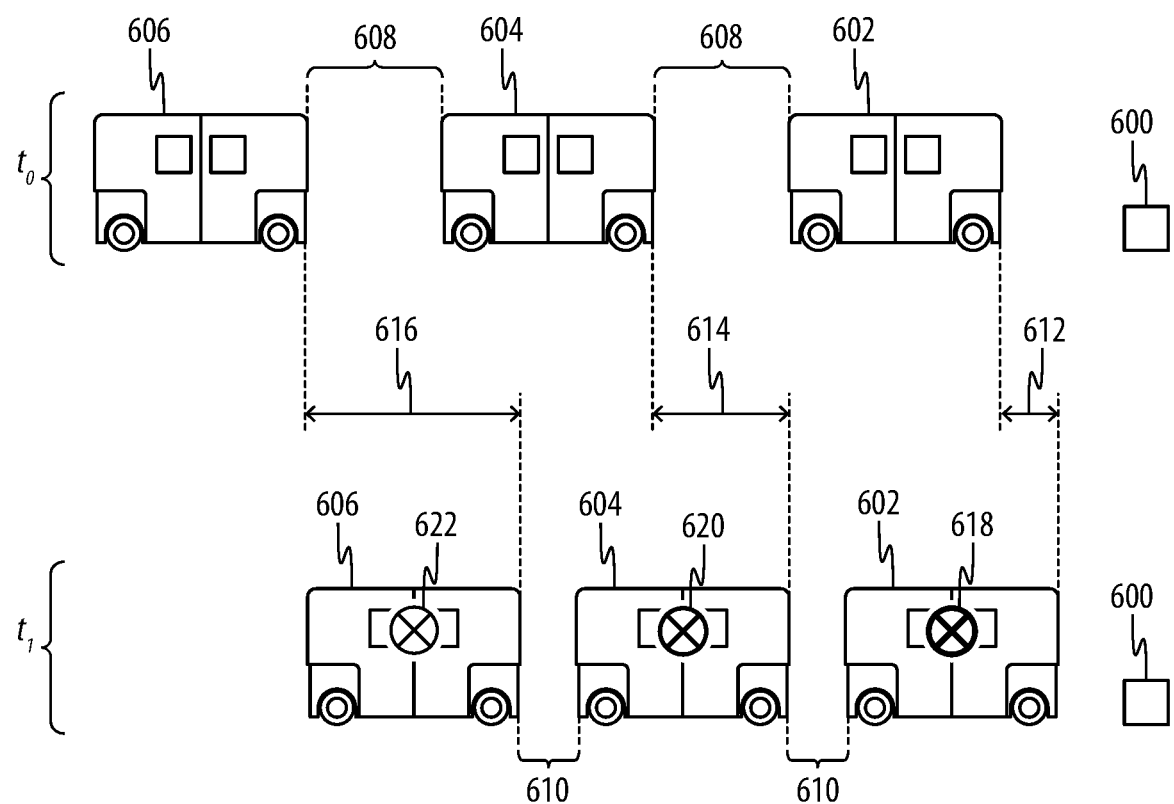
FIG. 6 depicts a plurality of vehicles decelerating according to a braking control scheme.

In one example braking control scheme, each vehicle is continuously (e.g., cyclically) determining the minimum deceleration rate that would be required in order to prevent a collision with an immediately adjacent upstream vehicle (which may be referred to herein as the vehicle's base deceleration rate). Then, when a vehicle receives information that the immediately adjacent upstream vehicle is going to start braking, it may evaluate its base deceleration rate with the deceleration rate that is advertised by the immediately adjacent upstream vehicle and determine what deceleration rate it should use for its own braking event, as well as what deceleration rate it should advertise or transmit to a trailing vehicle. This braking control scheme may be configured so that, if it is safe to do so, upstream vehicles decelerate at lower rates than downstream vehicles. FIGS. 4-6 illustrate an example braking control scheme that results in further upstream vehicles decelerating at lower deceleration values than downstream vehicles, thereby reducing the overall impact of a braking event (especially an emergency braking event) on other vehicles on the roadway.

As noted above, each vehicle in the transportation system may be configured to continuously or cyclically determine the minimum deceleration rate that would be required in order to prevent a collision with an immediately adjacent upstream vehicle. FIG. 4 illustrate two example vehicles, vehicle A 400 and vehicle B 402, travelling in the same direction (e.g., to the right). Vehicle A 400 may be travelling at a speed $V_A$, and vehicle B 402 may be travelling at a speed $V_B$, and vehicle B may be a distance d behind vehicle A. Each vehicle may include sensors that allow it to determine these values. For example, each vehicle may have a speedometer so that it can determine its own speed, as well as additional sensor system(s) that allow it to determine the distance d and the speed of an immediately adjacent downstream vehicle. Such sensor system(s) may include proximity sensors (e.g., optical, ultrasonic, etc.), radar (radio detection and ranging), lidar (Light Detection and Ranging), imaging systems, or any other suitable type of sensing systems, as well as any associated circuitry, processors, memory, hardware, software, firmware, or the like, that facilitate sensing functions. In some cases, a trailing vehicle (e.g., vehicle B 402) may determine the speed of an adjacent vehicle (e.g., vehicle A 400) based its own speed (e.g., as measured by a speedometer, GPS, or other system) and the change, if any, of distance d.

Given these values, the base deceleration rate $\dot{v}_B$ for vehicle B 402 may be defined by formula 1:

$$\dot{v}_B = \frac{v_B^2}{2d + \frac{v_A^2}{\dot{v}_A} - 2v_B r_B}$$

where $r_B$ is the reaction time of vehicle B 402 (e.g., the time between when a decision is made to decelerate and when the vehicle physically begins its deceleration maneuver), and $\dot{v}_A$ is received from vehicle A 400 via the optical communication systems of the vehicles (e.g., the optical communications systems 200, FIGS. 2A-2B). As noted, each vehicle may continuously or cyclically calculate its base declaration rate so that it maintains an accurate base deceleration value in case of an unexpected braking event.

Upon vehicle B 402 receiving, from the optical communication system of an immediately adjacent upstream vehicle (e.g., vehicle A 400), a braking indication signal and the deceleration value to be used by the immediately adjacent upstream vehicle (e.g., vehicle A 400) during the upcoming braking event, vehicle B 402 may evaluate its base deceleration rate relative to the received deceleration value of vehicle A 400, and take one or more actions based on the evaluation. For example, vehicle B 402 may determine if its base deceleration rate is greater than or equal to an upper deceleration value (e.g., a maximum deceleration value that vehicle B 402 can undergo without skidding). In accordance with a determination that the base deceleration rate is greater than or equal to the upper deceleration value, vehicle B 402 may decelerate (e.g., by causing a braking system of the vehicle to decelerate the vehicle) at the upper deceleration value. This determination and corresponding action reflects the fact that if vehicle B 402 is to avoid a collision with vehicle A 400, it must decelerate at the maximum safe rate.

If, on the other hand, vehicle B 402 determines that its base deceleration rate is less than the upper deceleration value and greater than a lower deceleration target, vehicle B may decelerate (e.g., by causing a braking system of the vehicle to decelerate the vehicle) at its base deceleration rate. The lower deceleration target may correspond to a deceleration rate that is comfortable for passengers of the vehicles, or is otherwise selected based on safety, comfort, passenger preference, or any other suitable factor. For example, the lower deceleration target may be about 1.5 m/s2, 2.0 m/s2, 2.5 m/s2, 3.0 m/s2, or any other suitable value.

If vehicle B 402 determines that its base deceleration rate is less than or equal to the lower deceleration target, vehicle B 402 may maintain its speed for at least a duration before beginning to decelerate. This operation may be due to the fact that emergency-level braking (e.g., above the lower deceleration target) and an immediate braking response (e.g., before detecting actual deceleration of an adjacent downstream vehicle) is not necessary in order to avoid a collision. Rather, vehicle B 402 can drive according to a normal operational mode in which it is at the lower deceleration target when it detects actual deceleration of an adjacent downstream vehicle. Thus, for example, after maintaining its speed for the duration, the vehicle B 402 may detect an actual deceleration of the immediately adjacent downstream vehicle (vehicle A 400), such as by determining a reduction in the distance between the vehicles, and, in response to detecting the deceleration of the adjacent downstream vehicle, begin decelerating at the lower deceleration target (e.g., by causing a braking system of the vehicle to decelerate the vehicle).

In order to continue the propagation of information through a group of vehicles, vehicle B 402 may also transmit information to adjacent upstream vehicles, and the particular information that is transmitted may be based at least in part on the deceleration value that it has selected based on information from a downstream vehicle. For example, in accordance with a determination that the base deceleration rate is greater than or equal to the upper deceleration value, vehicle B may transmit, to an adjacent upstream vehicle, a braking initiation signal and the upper deceleration value. On the other hand, in accordance with a determination that the base deceleration rate is less than the upper deceleration value and greater than the lower deceleration target, vehicle B 402 may transmit, to the adjacent upstream vehicle, a second braking initiation signal and the base deceleration rate.

The information transmitted by the upstream vehicle from vehicle B 402 informs the upstream vehicle that the vehicle B 402 is beginning its braking event and also indicates the deceleration value that vehicle B 402 will be using. Thus, the immediately adjacent upstream vehicle can make its own determination of what deceleration rates it should use by applying the same or similar operations as described with respect to vehicle B 402. This scheme facilitates rapid dissemination of braking information, and also results in a natural decay in braking aggressiveness through a group of vehicles such that any given vehicle does not have to use a greater deceleration rate than is necessary for comfort and/or safety. Stated another way, each vehicle determines if it is possible, given factors such as its speed, the distance to a downstream vehicle, the impending deceleration rate of the downstream vehicle, etc., to decelerate at a more gentle rate than the downstream vehicle. If it is possible and safe to decelerate at a lower decelerate rate, it will decelerate at that rate, which has the result of allowing further upstream vehicles to decelerate at even yet lower rates.

FIGS. 5-6 illustrate how the foregoing braking and communication schemes results in a decay or reduction of deceleration rates towards the upstream vehicles in a group of vehicles. For example, FIG. 5 illustrates a plot 500 with deceleration rate (y-axis) for six example vehicles (x-axis). Vehicle 1 may be the first vehicle in a group to encounter an obstacle or otherwise have a need to execute an emergency braking operation. In this example, vehicle 1 determines that in order to avoid (or increase its chance of avoiding) a collision or other issue, it must decelerate at an upper deceleration rate 502 (e.g., a maximum deceleration value that vehicle 1 can undergo without skidding). As described above, vehicle 1 will transmit, to an immediately adjacent upstream vehicle (vehicle 2) a braking initiation signal and its deceleration rate (e.g., the maximum value).

In the plot 500, vehicle 2 may evaluate its own deceleration rate (e.g., as calculated by formula 1) against the deceleration rate received from vehicle 1 in order to determine how to decelerate (and what information to provide to vehicle 3). In the example shown in FIG. 5, vehicle 2's own calculated deceleration rate (from formula 1) is below the upper deceleration rate but above a lower deceleration target 504. As described above, in this circumstance vehicle 2 will decelerate at its own calculated deceleration rate.

Vehicle 3, in turn, determines its own deceleration rate (e.g., as calculated by formula 1), receives, from vehicle 2, a braking initiation signal and vehicle 2's deceleration rate, and evaluates its own deceleration rate against the deceleration rate received from vehicle 2 in order to determine how to decelerate (and what information to provide to vehicle 4). In the example shown, vehicle 3's own calculated deceleration rate (from formula 1) is also below the upper deceleration rate 502 but above the lower deceleration target 504. As described above, in this circumstance vehicle 3 will decelerate at its own calculated deceleration rate rather than the upper deceleration rate 502 or the lower deceleration target 504.

In the example of FIG. 5, vehicle 4 is the first vehicle that can safely decelerate at the lower deceleration target 504. In particular, vehicle 4 determines its own deceleration rate (e.g., as calculated by formula 1), receives, from vehicle 3, a braking initiation signal and vehicle 3's deceleration rate, and evaluates its own deceleration rate against the deceleration rate received from vehicle 3 in order to determine how to decelerate (and what information to provide to vehicle 5). Because vehicle 4's own calculated deceleration rate (from formula 1) is at or below the lower deceleration target 504, vehicle 4 may wait to decelerate until it detects vehicle 3 decelerating, and may at that point begin decelerating at the lower deceleration target 504.

Vehicle 4 also transmits, to vehicle 5, vehicle 4's actual deceleration rate (here, the lower deceleration target 504) and a braking initiation signal. Vehicle 5 may thus determine that its own deceleration rate is also at or below the lower deceleration target 504. As such, vehicle 5 may also decelerate at the lower deceleration target 504 once it detects vehicle 4 actually decelerating. Vehicle 6 may operate in the same manner as vehicle 5.

The plot 500 in FIG. 5 demonstrates how the braking control scheme described herein results in a decay of the deceleration rates through a group of vehicles. More particularly, because each vehicle determines its own safe deceleration rates and because each vehicle is empowered to select its own deceleration rate if it is safe to do so, the system may prioritize both safety and comfort while also minimizing or reducing traffic flow disruptions.

One of the reasons that allows upstream vehicles to decelerate at a lower deceleration rate than downstream vehicles is that the vehicles may be configured to maintain a fixed (or at least predetermined) time interval between vehicles. Stated another way, vehicles may remain, for example, two seconds apart from one another, regardless of their speed. Under these conditions, the distance between vehicles will increase as the speed increases, and decrease as the speed decreases. The ability of the vehicles to reduce the physical distance between vehicles allows the upstream vehicles in a group of vehicles to use progressively lower deceleration values, as described with respect to FIG. 5.

FIG. 6 further illustrates how maintaining a time interval between vehicles (rather than a fixed or predetermined distance interval) facilitates progressively decreasing deceleration values in a group of vehicles. In particular, FIG. 6 illustrates a first vehicle 602, a second vehicle 604, and a third vehicle 606, all travelling towards the right side of the page. At time $t_0$, the gap 608 between adjacent vehicles may represent equal time intervals (e.g., two seconds, three seconds, four seconds, or any other suitable time), and each vehicle may be travelling at or near the same speed.

At time $t_0$, the first vehicle 602 may determine that it must execute a braking maneuver. For example, the first vehicle 602 may detect an object 600 (e.g., an obstacle) in the roadway or otherwise in the path of the first vehicle 602, and, as a result, determine that that it needs to decelerate. While the object 600 is shown as a simple square, this is merely representative of any impediment, location, object, or indeed anything that a vehicle may encounter and that should be avoided, including but not limited to holes, potholes, curbs, animals, other vehicles, chemical or other spills on the road surface, light poles, intersections, stop signs, red lights, rocks, puddles, unidentifiable objects, road debris, construction signs, bollards, buildings, and so forth.

The first vehicle 602 may determine a deceleration value that is necessary in order to it to avoid colliding or otherwise interacting with the object 600. The deceleration value may be based at least in part on the speed of the first vehicle 602, the distance to the object 600, motion characteristics of the object 600 (e.g., speed, direction of motion, acceleration, etc.), an upper deceleration value (e.g., a maximum deceleration value that the first vehicle 602 can undergo without skidding), existing road conditions, current tire conditions, Other factors may also be used to determine the deceleration value for the first vehicle 602.

Time $t_1$ illustrates an example of the relative positions of the vehicles 602, 604, 606 during the braking event initiated when the first vehicle 602 begun braking. As shown in $t_1$, the first vehicle 602 is decelerating at a relatively high rate, as illustrated by a deceleration magnitude indicator (e.g., the deceleration magnitude indicator 618). The boldness of a deceleration magnitude indicator may represent and/or indicate the relative magnitude of the deceleration value being employed by that vehicle. As shown, from $t_0$ to $t_1$, the first vehicle 602 has decelerated over a distance 612. The second vehicle 604, on the other hand, was able to decelerate over a distance 614, which is greater than the distance 612. The greater distance 614 available to the second vehicle 604 may be due at least in part on the fact that at slower speeds, the physical distance between the vehicles can be reduced while still maintaining a target time interval. For example, the time interval between the vehicles at time to and $t_1$ may be the same, despite the physical distance of the gaps 608, 610 being different (e.g., the gaps 610 being smaller than the gaps 608). Returning to the second vehicle 604, because it was able to decelerate over a distance 614 that is greater than the distance 612, it was able to use a lower deceleration value, as indicated by the less bold deceleration magnitude indicator 620. Similarly, because the third vehicle 606 can reduce its distance to the second vehicle 604 during braking (while still maintaining the same safe time interval represented by the gaps 608 and 610), the third vehicle 606 is able to decelerate over a distance 616, which is greater than the distance 614. Thus, the third vehicle 606 can apply an even lower deceleration value, as indicated by the least bold deceleration magnitude indicator 622.

The vehicles in FIG. 6 may communicate with one another to provide deceleration values and braking indication signals, as described above. For example, the trailing vehicles each receive the deceleration values of the immediately adjacent downstream vehicle, thereby allowing the trailing vehicles to calculate their own deceleration values (e.g., using formula 1, above), compare their calculated deceleration values to the upper deceleration values and lower deceleration targets, and determine how to decelerate based on the results of the comparison.

In the instant application, the term braking may refer to any operations that result in deceleration of a vehicle, and is not limited to any particular mechanism or technique for decelerating the vehicle. For example, braking may be achieved using braking systems that use mechanical friction to resist wheel motion (e.g., disc brakes, drum brakes, etc.), motors (e.g., electrical, internal combustion, etc.) applying a torque to the wheels that opposes wheel motion, aerodynamic braking systems (e.g., parachutes, movable fins, wings, or other objects), external friction-based systems (e.g., bars, boards, or other objects that are forced into contact with the ground, a rail, or another object), forced-air systems (e.g., rockets, turbines, fans, or the like), or any other suitable systems (or combinations of the foregoing or other systems).

The braking control schemes described herein may be used with or by a transportation system in which numerous vehicles may be autonomously operated to transport passengers and/or freight along a roadway. For example, a transportation system or service may provide a fleet of vehicles that operate along the roadway. Vehicles in such a transportation system may be configured to operate autonomously, such as according to one or more vehicle control schemes. As used herein, the term "autonomous" may refer to a mode or scheme in which vehicles can operate without continuous, manual control by a human operator. For example, driverless vehicles may navigate along a roadway using a system of automatic drive and steering systems that control the speed and direction of the vehicle. In some cases, the vehicles may not require steering, speed, or directional control from the passengers, and may exclude controls such as passenger-accessible accelerator and brake pedals, steering wheels, and other manual controls. In some cases, the vehicles may include manual drive controls that may be used for maintenance, emergency overrides, or the like. Such controls may be hidden, stowed, or otherwise not directly accessible by a user during normal vehicle operation. For example, they may be designed to be accessed only by trained operators, maintenance personnel, or the like.

Autonomous operation need not exclude all human or manual operation of the vehicles or of the transportation system as a whole. For example, human operators may be able to intervene in the operation of a vehicle for safety, convenience, testing, or other purposes. Such intervention may be local to the vehicle, such as when a human driver takes controls of the vehicle, or remotely, such as when an operator sends commands to the vehicle via a remote control system. Similarly, some aspects of the vehicles may be controlled by passengers of the vehicles. For example, a passenger in a vehicle may select a target destination, select a route, select a speed, control the operation of the doors and/or windows, or the like. Accordingly, it will be understood that the terms "autonomous" and "autonomous operation" do not necessarily exclude all human intervention or operation of the individual vehicles or of the overall transportation system.

The vehicles in the transportation system may include various sensors, cameras, communications systems, processors, and/or other components or systems that help facilitate autonomous operation. For example, the vehicles may include a sensor array that detects magnets or other markers embedded in the roadway and which help the vehicle determine its location, position, and/or orientation on the roadway. The vehicles may also include wireless vehicle-to-vehicle communications systems, such as optical communications systems (e.g., optical communication systems 200, FIGS. 2A-2B), that allow the vehicles to inform one another of operational parameters such as deceleration information (e.g., braking initiation signals, deceleration values, etc.), the number of vehicles ahead in a platoon, acceleration status, their next maneuver (e.g., right turn, left turn, planned stop), their number or type of payload (e.g., humans or freight), or the like. The vehicles may also include wireless communications systems to facilitate communication with a transportation system controller that has supervisory command and control authority over the transportation system (e.g., using cellular, WiFi, or other suitable wireless communication technologies).

The vehicles in the transportation system may be designed to enhance the operation and convenience of the transportation system. For example, a primary purpose of the transportation system may be to provide comfortable, convenient, rapid, and efficient personal transportation. To provide personal comfort, the vehicles may be designed for easy passenger ingress and egress, and may have comfortable seating arrangements with generous legroom and headroom. The vehicles may also have a sophisticated suspension system that provides a comfortable ride and dynamically adjustable parameters to help keep the vehicle level, positioned at a convenient height, and to ensure a comfortable ride throughout a range of variable load weights.

Conventional personal automobiles are designed for operation primarily in only one direction. This is due in part to the fact that drivers are oriented forwards, and operating in reverse for long distances is generally not safe or necessary. However, in autonomous vehicles, where humans are not directly controlling the operation of the vehicle in real-time, it may be advantageous for a vehicle to be able to operate bidirectionally. For example, the vehicles in a transportation system as described herein may be substantially symmetrical, such that the vehicles lack a visually or mechanically distinct front or back. Further, the wheels may be controlled sufficiently independently so that the vehicle may operate substantially identically no matter which end of the vehicle is facing the direction of travel. This symmetrical design provides several advantages. For example, the vehicle may be able to maneuver in smaller spaces by potentially eliminating the need to make U-turns or other maneuvers to re-orient the vehicles so that they are facing "forward" before initiating a journey.

Figure 7A:
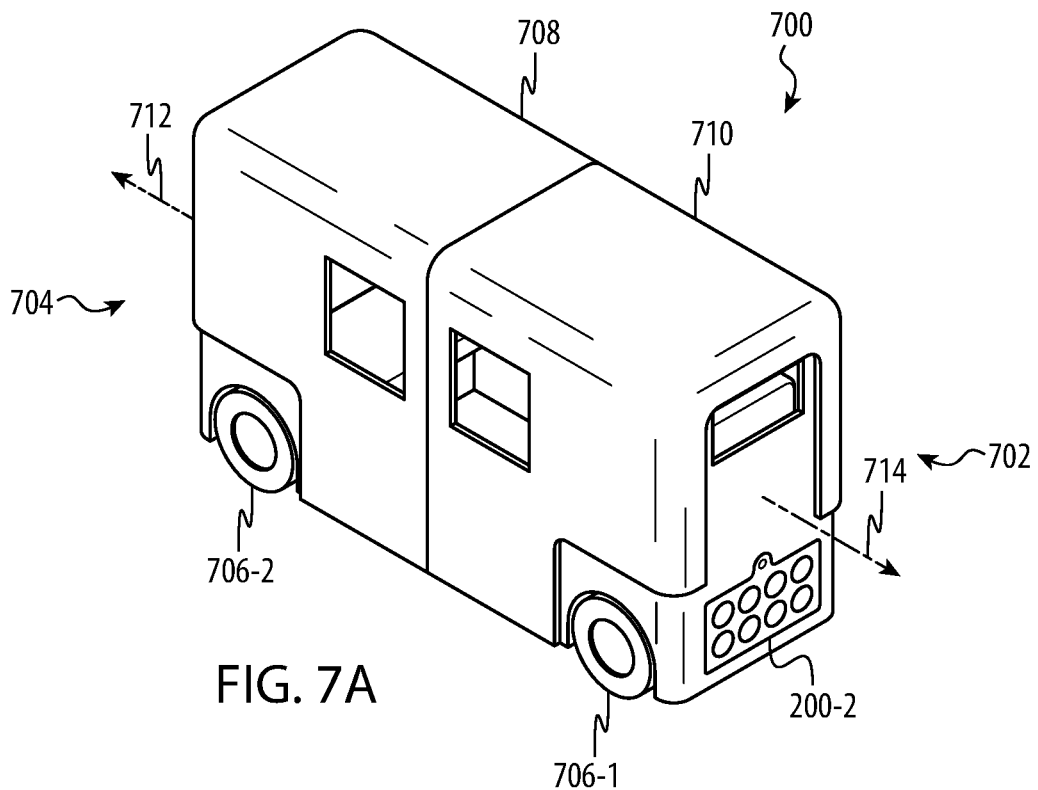
FIGS. 7A-7B depict an example vehicle.
Figure 7B:
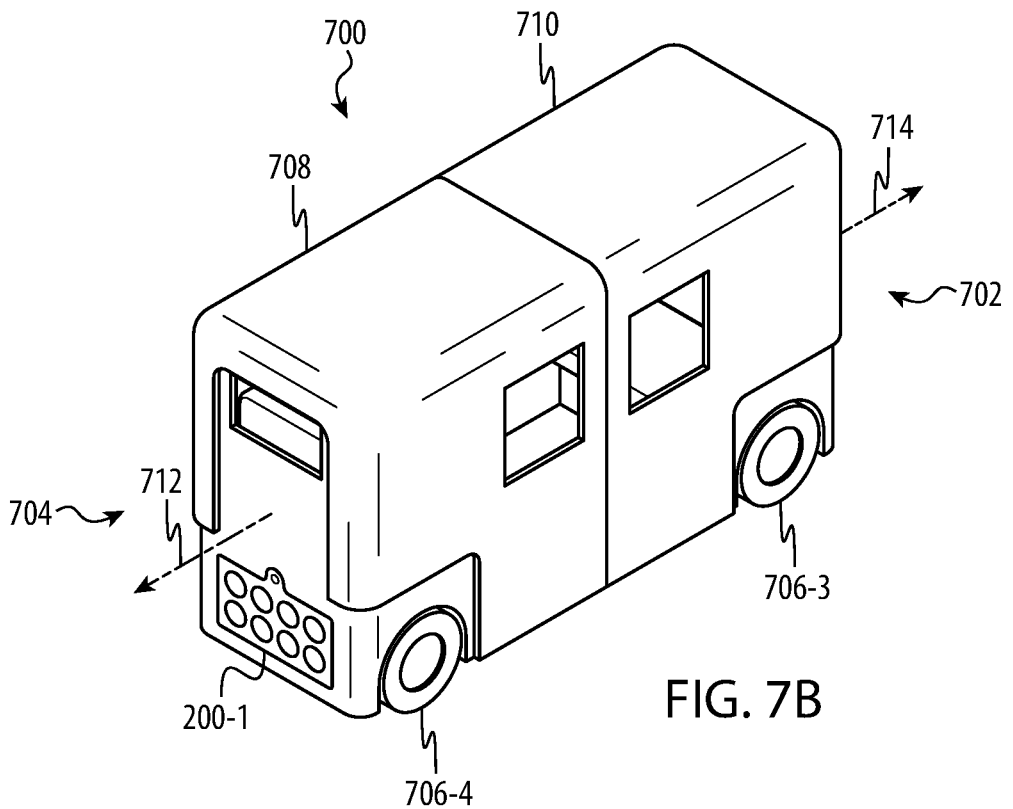

FIGS. 7A and 7B are perspective views of an example four-wheeled roadway vehicle 700 (referred to herein simply as a "vehicle") that may be used in a transportation system as described herein. The vehicle 700 may be an embodiment of the vehicle 108 (FIGS. 1-2B), or any other vehicle(s) described herein. FIGS. 7A-7B illustrate the symmetry and bidirectionality of the vehicle 700. In particular, the vehicle 700 defines a first end 702, shown in the forefront in FIG. 7A, and a second end 704, shown in the forefront in FIG. 7B. In some examples and as shown, the first and second ends 702, 704 are substantially identical. Moreover, the vehicle 700 may be configured so that it can be driven with either end facing the direction of travel. For example, when the vehicle 700 is travelling in the direction indicated by arrow 714, the first end 702 is the leading end of the vehicle 700, while when the vehicle 700 is traveling in the direction indicated by arrow 712, the second end 704 is the leading end of the vehicle 700.

The vehicle 700 may also include wheels 706 (e.g., wheels 706-1-706-4). The wheels 706 may be paired according to their proximity to an end of the vehicle. Thus, wheels 706-1, 706-3 may be positioned proximate the first end 702 of the vehicle and may be referred to as a first pair of wheels 706, and the wheels 706-2, 706-4 may be positioned proximate the second end 704 of the vehicle and may be referred to as a second pair of wheels 706. The wheels may be driven by a drive system, which may include motors, engines, motor controllers, speed controllers, computers, processors, and any other suitable components, systems, sub-systems, or the like, that facilitate propelling (and optionally braking or slowing) the vehicle. Each pair of wheels may be driven by at least one motor (e.g., an electric motor), and each pair of wheels may be able to steer the vehicle. Because each pair of wheels is capable of turning to steer the vehicle, the vehicle may have similar driving and handling characteristics regardless of the direction of travel. In some cases, the vehicle may be operated in a two-wheel steering mode, in which only one pair of wheels steers the vehicle 700 at a given time. In such cases, the particular pair of wheels that steers the vehicle 700 may change when the direction of travel changes. In other cases, the vehicle may be operated in a four-wheel steering mode, in which the wheels are operated in concert to steer the vehicle. In a four-wheel steering mode, the pairs of wheels may either turn in the same direction or in opposite directions, depending on the steering maneuver being performed and/or the speed of the vehicle.

The vehicle 700 may also include doors 708, 710 that open to allow passengers and other payloads (e.g., packages, luggage, freight) to be placed inside the vehicle 700. The doors 708, 710, which are described in greater detail herein, may extend over the top of the vehicle such that they each define two opposite side segments. For example, each door defines a side segment on a first side of the vehicle and another side segment on a second, opposite side of the vehicle. The doors also each define a roof segment that extends between the side segments and defines part of the roof (or top side) of the vehicle. In some cases, the doors 708, 710 resemble an upside-down "U" in cross-section and may be referred to as canopy doors. The side segments and the roof segment of the doors may be formed as a rigid structural unit, such that all of the components of the door (e.g., the side segments and the roof segment) move in concert with one another. In some cases, the doors 708, 710 include a unitary shell or door chassis that is formed from a monolithic structure. The unitary shell or door chassis may be formed from a composite sheet or structure including, for example, fiberglass, carbon composite, and/or other lightweight composite materials.

The vehicle 700 may also include a vehicle controller that controls the operations of the vehicle 700 and the vehicle's systems and/or subsystems. For example, the vehicle controller may control the vehicle's drive system, braking system, steering system, suspension system, doors, and the like, to facilitate vehicle operation, including to navigate the vehicle along a roadway in accordance with one or more vehicle control schemes and to control the operation of the braking system according to one or more braking control schemes described herein. The vehicle controller may also be configured to communicate with other vehicles (e.g., via the optical communications systems 200), the transportation system controller, and/or other components of the transportation system. For example, the vehicle controller may be configured to receive information from other vehicles about those vehicles' position in a platoon, speed, upcoming speed or direction changes, upcoming braking events, or the like. The vehicle controller may include computers, processors, memory, circuitry, or any other suitable hardware components, and may be interconnected with other systems of the vehicle to facilitate the operations described herein, as well as other vehicle operations.

Figure 8A:
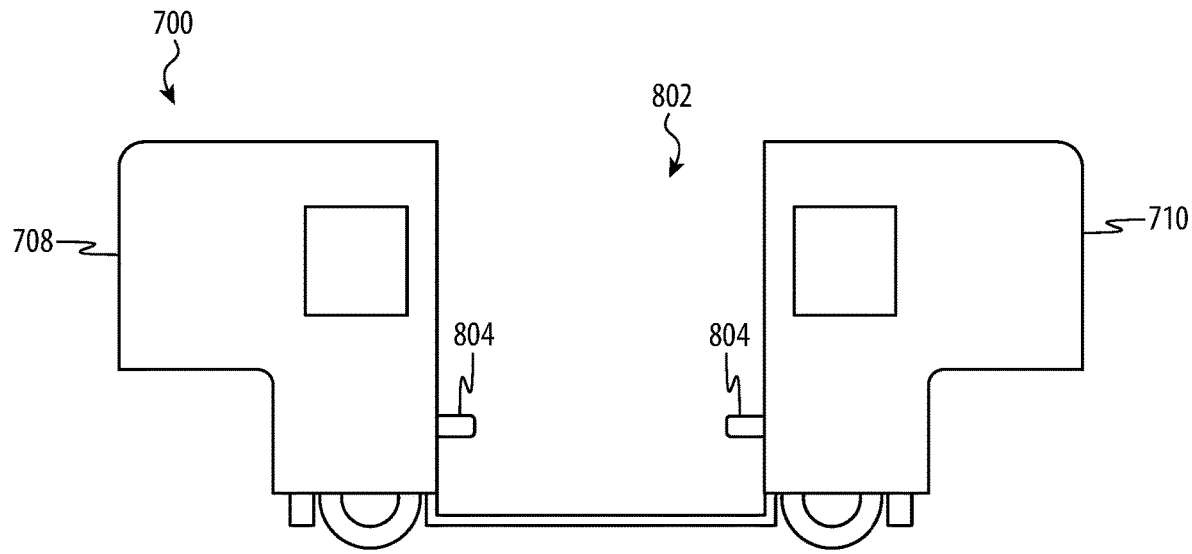
FIGS. 8A-8B depict the vehicle of FIGS. 7A-7B with its doors open.
Figure 8B:
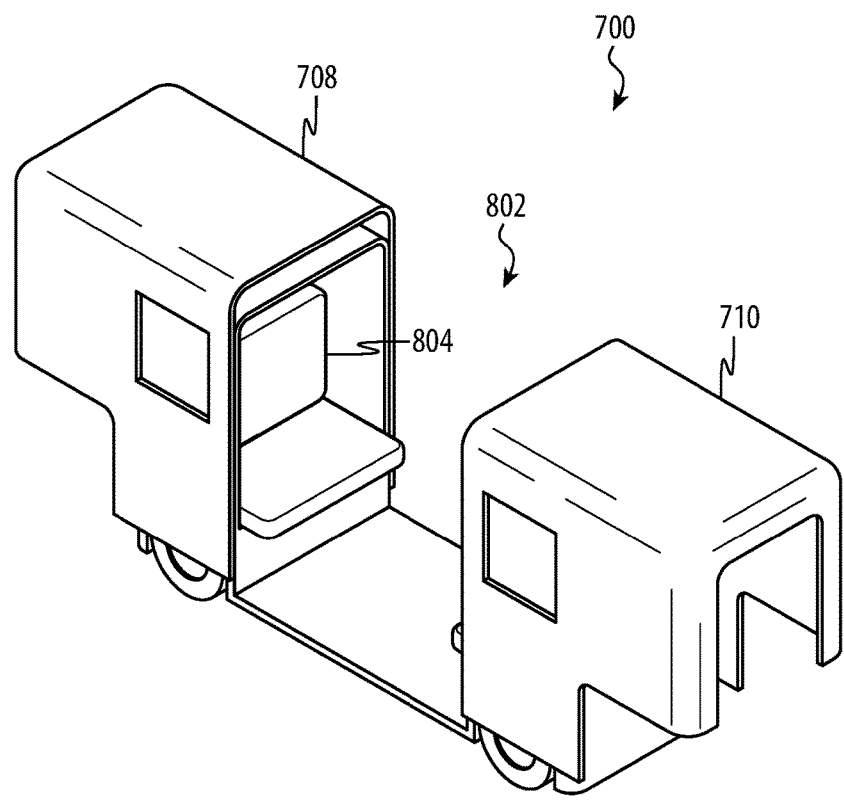

FIGS. 8A and 8B are side and perspective views of the vehicle 700 with the doors 708, 710 in an open state. Because the doors 708, 710 each define two opposite side segments and a roof segment, an uninterrupted internal space 802 may be revealed when the doors 708, 710 are opened. In the example depicted in FIGS. 8A and 8B, when the doors 708, 710 are opened, an open section may be defined between the doors 708, 710 that extends from one side of the vehicle 700 to the other. This may allow for unimpeded ingress and egress into the vehicle 700 by passengers on either side of the vehicle 700. The lack of an overhead structure when the doors 708, 710 are opened may allow passengers to walk across the vehicle 700 without a limit on the overhead clearance.

The vehicle 700 may also include seats 804, which may be positioned at opposite ends of the vehicle 700 and may be facing one another. As shown, the vehicle includes two seats 804, though other numbers of seats and other arrangements of seats are also possible (e.g., zero seats, one seat, three seats, etc.). In some cases, the seats 804 may be removed, collapsed, or stowed so that wheelchairs, strollers, bicycles, or luggage may be more easily placed in the vehicle 700.

Figure 9:
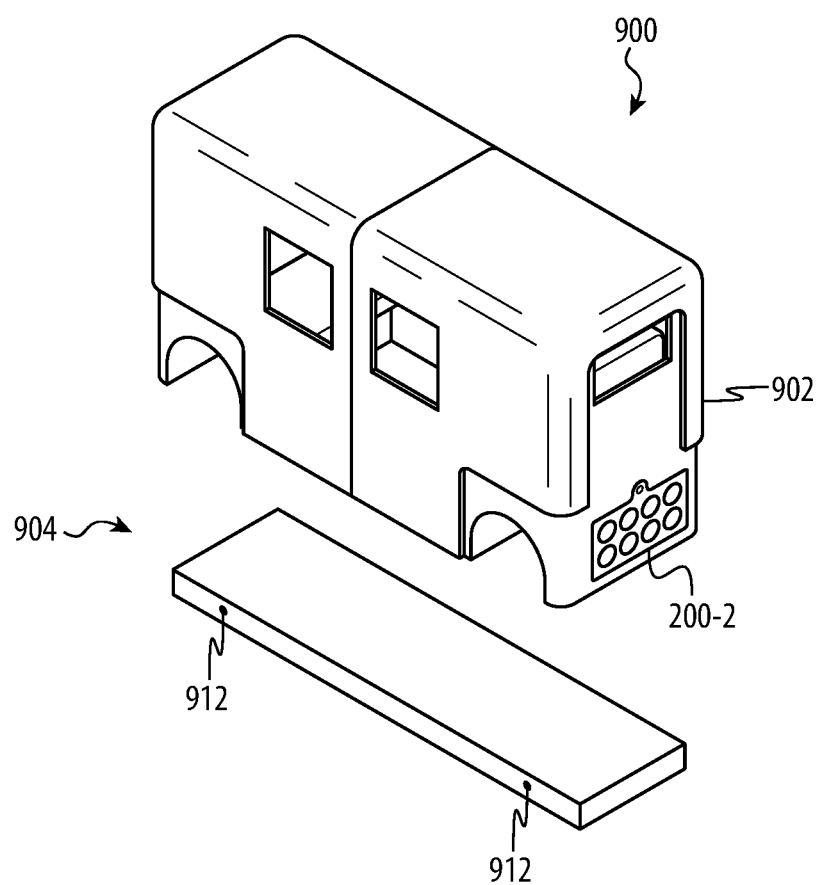
FIG. 9 depicts a partial exploded view of an example vehicle.

Vehicles for use in a transportation system as described herein, such as the vehicle 700, may be designed for safe and comfortable operation, as well as for ease of manufacture and maintenance. To achieve these advantages, the vehicles may be designed to have a frame structure that includes many of the structural and operational components of the vehicle (e.g., the motor, suspension, batteries, etc.) and that is positioned low to the ground. A body structure may be attached or secured to the frame structure. FIG. 9 illustrates a partial exploded view of a vehicle, which may be an embodiment of the vehicles 108, 700 (or any other vehicle described herein), showing an example configuration of a frame structure and body structure. As described below, the low position of the frame structure combined with the relatively lightweight body structure produces a vehicle with a very low center of gravity, which increases the safety and handling of the vehicle. For example, a low center of gravity reduces the rollover risk of the vehicle when the vehicle encounters slanted road surfaces, wind loading, sharp turns, or the like, and also reduces body roll of the vehicle during turning or other maneuvers. Further, by positioning many of the operational components of the vehicle, such as motors, batteries, a vehicle controller, sensors (e.g., sensors that detect road-mounted magnets or other markers), and the like, on the frame structure (e.g., the frame structure 904, FIG. 9), manufacture and repair may be simplified.

FIG. 9 is a partial exploded view of a vehicle 900, which may be an embodiment of the vehicle 700. Details of the vehicle 700 may be equally applicable to the vehicle 900, and will not be repeated here. The vehicle 900 may include a body structure 902, which may include doors (e.g., the doors 708, 710, described above) and other body components, and a frame structure 904 to which the body structure 902 is attached.

The frame structure 904 may include drive, suspension, and steering components of the vehicle. For example, the frame structure 904 may include wheel suspension systems (which may define or include wheel mounts, axles, or hubs, represented in FIG. 9 as points 912), steering systems, a drive system (e.g., motors, engines, etc.), braking systems (e.g., disk brakes, drum brakes, etc.), and optionally motor controllers. Wheels may be mounted to the wheel suspension systems via the wheel mounts, axles, hubs, or the like. The drive motors may include one or more drive motors that drive the wheels, either independently or in concert with one another. The drive motors may receive power from a power source (e.g., battery) that is mounted on the frame structure 904. Motor controllers for the drive motors may also be mounted on the frame structure 904.

The suspension systems may be any suitable type of suspension system. In some cases, the suspension systems include independent suspension systems for each wheel. For example, the suspension systems may be double-wishbone torsion-bar suspension systems. The suspension systems may also be dynamically adjustable, such as to control the ride height, suspension preload, damping, or other suspension parameters while the vehicle is stationary or while it is moving. Other suspension systems are also contemplated, such as swing axle suspension, sliding pillar suspension, MacPherson strut suspension, or the like. Moreover, spring and damping functions may be provided by any suitable component or system, such as coil springs, leaf springs, pneumatic springs, hydropneumatic springs, magneto-rheological shock absorbers, and the like. The suspension systems may be configured to operate in conjunction with the contour of a road surface (e.g., of a roadway as described above) to maintain a desired experience for a passenger.

The frame structure 904 may also include steering systems that allow the wheels to be turned to steer the vehicle. In some cases the wheels may be independently steerable, or they may be linked (e.g., via a steering rack) so that they always point in substantially the same direction during normal operation of the vehicle. Further, this allows the vehicles to use four-wheel steering schemes, as well as to alternate between two-wheel steering and four-wheel steering schemes.

The frame structure 904 may include components such as batteries, motors, and mechanisms for opening and closing the vehicle's doors, control systems (including computers or other processing units), and the like.

FIG. 9 illustrates example configurations of vehicles and frame structures. Other configurations are also possible, however. Moreover, the frame structure and the body structure shown in FIG. 9 are intended more as schematic representations of these components, and these components may include other structures that are omitted from FIG. 9 for clarity. Additional structural connections and integrations may be made between the body structure and the frame structure than are explicitly represented in FIG. 9. For example, components of a door mechanism that open and close the doors of the body structures may be joined to both the doors and to the frame structure.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments. Further, while the term "roadway" is used herein to refer to structures that support moving vehicles, the roadway described herein does not necessarily conform to any definition, standard, or requirement that may be associated with the term "roadway," such as may be used in laws, regulations, transportation codes, or the like. As such, the roadway described herein is not necessarily required to (and indeed may not) provide the same features and/or structures of a conventional "roadway." Of course, the roadways described herein may comply with any and all applicable laws, safety regulations, or other rules for the safety of passengers, bystanders, operators, builders, maintenance personnel, or the like.

What is claimed is:

1. A method of decelerating a plurality of vehicles along a roadway, comprising:
   at a first vehicle:
      receiving, from an adjacent downstream vehicle:
         a braking indication signal indicating initiation of a braking operation of the adjacent downstream vehicle; and a first deceleration value indicating a deceleration rate of the adjacent downstream vehicle; and in response to receiving the braking indication signal:
 determining a distance to the adjacent downstream vehicle;
 determining, based at least in part on the first distance, a second deceleration value configured to prevent the first vehicle from colliding with the adjacent downstream vehicle;
 in accordance with a determination that the second deceleration value is greater than or equal to an upper deceleration value, decelerating at the upper deceleration value;
 in accordance with a determination that the second deceleration value is less than the upper deceleration value and greater than a lower deceleration target, the lower deceleration target having a non-zero value, decelerating at the second deceleration value;
 in accordance with a determination that the second deceleration value is less than or equal to the lower deceleration target:
  after receiving the braking indication signal, maintaining a speed of the first vehicle for a duration; and
  after maintaining the speed of the first vehicle for the duration:
   determining, based at least in part on an updated distance to the adjacent downstream vehicle, that a third deceleration value configured to prevent the first vehicle from colliding with the adjacent downstream vehicle has reached the lower deceleration target; and
   in accordance with a determination that the third deceleration value has reached the lower deceleration target, decelerating at the lower deceleration target.

2. The method of claim 1, wherein:
the braking indication signal is a first braking indication signal; and
the method further comprises, in accordance with the determination that the second deceleration value is greater than or equal to the upper deceleration value, transmitting, to an adjacent upstream vehicle:
a second braking indication signal; and
the upper deceleration value.

3. The method of claim 2, further comprising, in accordance with the determination that the second deceleration value is less than the upper deceleration value and greater than the lower deceleration target, transmitting, to the adjacent upstream vehicle:
the second braking indication signal; and
the second deceleration value.

4. The method of claim 1, wherein the second deceleration value is further based at least partially on:
a speed of the first vehicle;
a speed of the adjacent downstream vehicle; and
the first deceleration value.

5. The method of claim 1, wherein the upper deceleration value corresponds to a maximum deceleration value that the first vehicle can undergo without skidding.

6. The method of claim 1, wherein:
the adjacent downstream vehicle comprises an optical output system configured to transmit information; and
the first vehicle comprises an optical sensing system configured to receive information transmitted by the optical output system.

7. The method of claim 6, wherein the braking indication signal is transmitted via the optical output system of the adjacent downstream vehicle and received by the optical sensing system of the first vehicle.

8. The method of claim 6, wherein the first deceleration value is transmitted, via the optical output system of the adjacent downstream vehicle, as an encoded signal.

9. A vehicle comprising:
a drive system configured to propel the vehicle;
a braking system configured to decelerate the vehicle;
a steering system configured to steer the vehicle; and
a vehicle controller configured to:
 receive, from an adjacent downstream vehicle:
  a first braking indication signal indicating initiation of a braking operation of the adjacent downstream vehicle; and
  a first deceleration value indicating a deceleration rate of the adjacent downstream vehicle; and
 in response to receiving the first braking indication signal:
  determine a distance to the adjacent downstream vehicle;
  determine, based at least in part on the first distance, a second deceleration value configured to prevent the vehicle from colliding with the adjacent downstream vehicle;
  in accordance with a determination that the second deceleration value is greater than or equal to an upper deceleration value, cause the braking system to decelerate the vehicle at the upper deceleration value;
  in accordance with a determination that the second deceleration value is less than the upper deceleration value and greater than a lower deceleration target, the lower deceleration target having a non-zero value, cause the braking system to decelerate the vehicle at the second deceleration value; and
  in accordance with a determination that the second deceleration value is less than or equal to the lower deceleration target:
   after receiving the first braking indication signal, maintain a speed of the vehicle for a duration; and
   after maintaining the speed of the first vehicle for the duration:
    determine, based at least in part on an updated distance to the adjacent downstream vehicle, that a third deceleration value configured to prevent the vehicle from colliding with the adjacent downstream vehicle has reached the lower deceleration target; and
    in accordance with a determination that the third deceleration value has reached the lower deceleration target, decelerate at the lower deceleration target.

10. The vehicle of claim 9, wherein the vehicle controller is further configured to determine the second deceleration value based additionally at least in part on a speed of the vehicle and a speed of the adjacent downstream vehicle.

11. The vehicle of claim 10, wherein the vehicle controller is further configured to, in accordance with the determination that the second deceleration value is greater than or equal to the upper deceleration value, transmit deceleration information to an adjacent upstream vehicle, the deceleration information comprising:
a second braking indication signal; and
the upper deceleration value.

12. The vehicle of claim 11, wherein:
the deceleration information is first deceleration information; and
the vehicle controller is further configured to, in accordance with the determination that the second deceleration value is less than the upper deceleration value, transmit second deceleration information to the adjacent upstream vehicle, the second deceleration information comprising:
the second braking indication signal; and
the second deceleration value.

13. The vehicle of claim 12, wherein the vehicle further comprises:
an optical output system configured to transmit the first deceleration information and the second deceleration information to the adjacent upstream vehicle; and
an optical sensing system configured to receive the first braking indication signal and the first deceleration value.

14. A method of decelerating a plurality of vehicles along a roadway, comprising:
at a first vehicle:
receiving, from an adjacent downstream vehicle:
a first braking indication signal; and
a first deceleration value indicating a deceleration rate of the adjacent downstream vehicle;
determining a second deceleration value configured to prevent the first vehicle from colliding with the adjacent downstream vehicle;
in accordance with a determination that the second deceleration value is greater than or equal to an upper deceleration value:
transmitting, to a second vehicle:
a second braking indication signal indicating initiation of a braking operation of the first vehicle; and
the upper deceleration value; and
decelerating at the upper deceleration value; and
at the second vehicle:
receiving, from the first vehicle:
the second braking indication signal; and
the upper deceleration value; and
in response to receiving the second braking indication signal:
determining a third deceleration value configured to prevent the second vehicle from colliding with the first vehicle;
in accordance with a determination that the third deceleration value is less than the upper deceleration value and greater than a lower deceleration target, the lower deceleration target having a non-zero value:
transmitting, to an adjacent upstream vehicle:
a third braking indication signal; and
the third deceleration value; and
decelerating at the third deceleration value; and
in accordance with a determination that the third deceleration value is less than or equal to the lower deceleration target:
maintaining a speed of the second vehicle for a duration; and
after maintaining the speed of the second vehicle for the duration:
determining, based at least in part on an updated distance to the first vehicle, that a fourth deceleration value configured to prevent the second vehicle from colliding with the first vehicle has reached the lower deceleration target; and
in accordance with a determination that the fourth deceleration value has reached the lower deceleration target, decelerating at the lower deceleration target.

15. The method of claim 14, further comprising, at the second vehicle:
in accordance with a determination that the third deceleration value is greater than or equal to the upper deceleration value:
transmitting, to the adjacent upstream vehicle:
the third braking indication signal; and
the upper deceleration value; and
decelerating at the upper deceleration value.

16. A method of determining a deceleration rate for vehicles in a platoon of vehicles, comprising:
at each respective vehicle in the platoon:
determining a respective distance to a respective adjacent downstream vehicle; and
determining a respective deceleration value based at least in part on the respective distance; and
at a vehicle of the platoon associated with a first deceleration value and travelling at a speed:
receiving, from an adjacent downstream vehicle:
a braking indication signal indicating initiation of a braking operation of the adjacent downstream vehicle; and
a second deceleration value of an upcoming braking event of the adjacent downstream vehicle; and
in response to receiving the braking indication signal:
in accordance with a determination that the first deceleration value is greater than or equal to an upper deceleration value, decelerating at the upper deceleration value;
in accordance with a determination that the first deceleration value is less than the upper deceleration value and greater than a lower deceleration target, the lower deceleration target having a non-zero value, decelerating at the first deceleration value; and
in accordance with a determination that the first deceleration value is less than or equal to the lower deceleration target:
after receiving the braking indication signal, maintaining the vehicle at the speed for a duration; and
after maintaining the vehicle at the speed for the duration:
determining, based at least in part on an updated distance to the adjacent downstream vehicle, that a third deceleration value configured to prevent the vehicle from colliding with the adjacent downstream vehicle has reached the lower deceleration target; and
in accordance with a determination that the third deceleration value has reached the lower deceleration target, decelerating at the lower deceleration target.

17. The method of claim 16, wherein:
the method further comprises, at each respective vehicle in the platoon, determining a speed of the respective adjacent downstream vehicle; and
the respective deceleration value is determined based at least in part on the speed of the respective adjacent downstream vehicle.

18. The method of claim 16, further comprising, at the vehicle:

after maintaining the vehicle at the speed:

detecting a deceleration of the adjacent downstream vehicle; and decelerating at the lower deceleration target.

19. The method of claim 18, wherein:

the upper deceleration value corresponds to a maximum deceleration value that the vehicle can undergo without skidding; and the lower deceleration target is below 2.0 m/s$^2$.

* * * * *